Patented Mar. 20, 1951

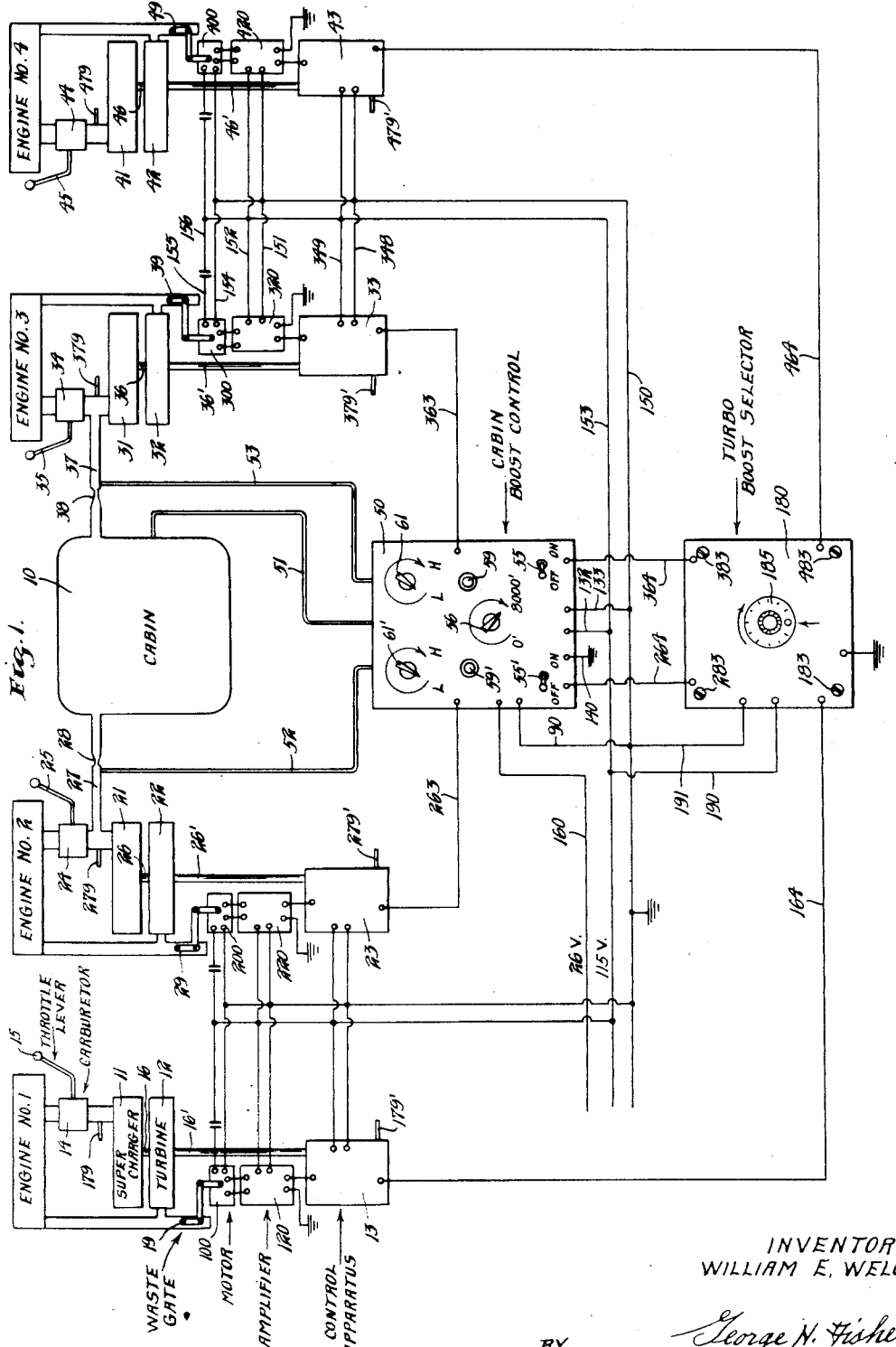

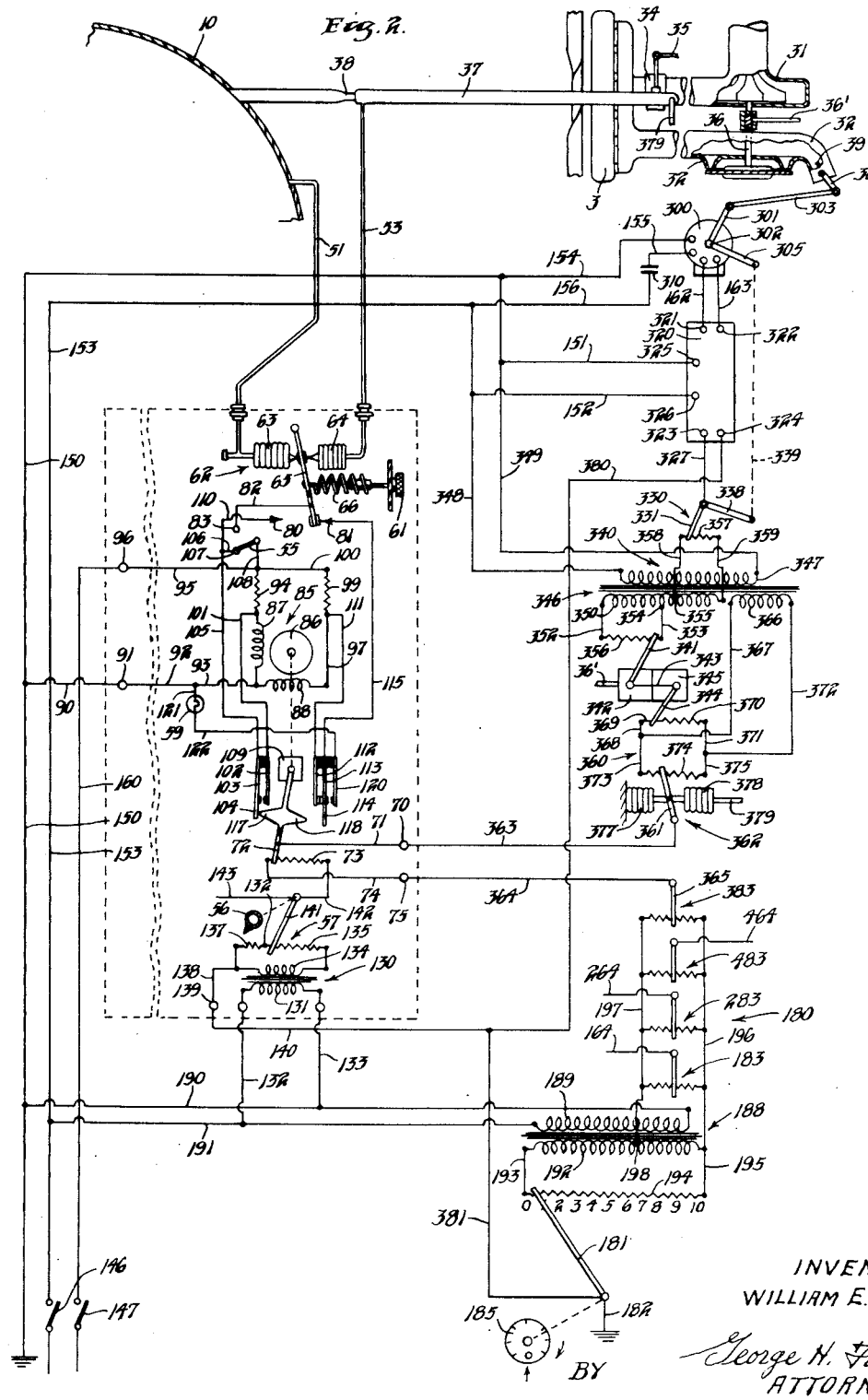

2,545,563

UNITED STATES PATENT OFFICE 2,545,563

AIR FLOW CONTROL APPARATUS

William Evert Welch, Minneapolis, Minn., assignor to Minneapolis-Honeywell Regulator Company, Minneapolis, Minn., a corporation of Delaware Application December 26, 1944, Serial No. 569,791

13 Claims. (Cl. 244—59)

1

The present invention relates to the pressurizing of an aircraft cabin. It has been found that a suitable source of air under pressure for pressurizing an aircraft cabin is the turbo supercharging equipment of the aircraft power plant. The air required for ventilating and maintaining cabin pressure is but a small fraction of the air required for the aircraft engines, therefore air for the cabin can readily be obtained by diverting a portion of the discharge from one or more superchargers into said cabin.

By the use of a flow limiting means in the conduit through which air is diverted from the superchargers into the cabin, the means for controlling cabin pressure under some conditions, comprises merely means for regulating the flow of air from the cabin. However, superchargers of a multi-engined airplane may be simultaneously regulated from a single control means in a manner to maintain uniform pressure boost and uniform engine power. If a low boost in pressure is needed for the engines, the discharge pressure of the superchargers may be less than the pressure required in the cabin. Under these circumstances, there may be no flow of air into the cabin, ventilation stops, and pressure cannot be maintained, thus causing the cabin pressure to drop below that required.

It is therefore a principal object of this invention to provide means for controlling the turbo superchargers of an aircraft according to the air needs of the engines, but wherein the control of the supercharger or superchargers supplying cabin air may be modified to automatically maintain at all times sufficient discharge pressure to insure a desired flow of air to the cabin.

It is an object of this invention to provide control means for adjustably establishing a variable low limit of turbo supercharger discharge pressure enough above cabin pressure to insure the desired airflow to said cabin.

It is an additional object to provide simple, light, and compact apparatus for modifying an electrical control system for a plurality of turbo superchargers in a manner to insure desired discharge pressure.

It is also an object to provide means automatically divorcing the control of an inboard engine supercharger from that of an outboard engine supercharger when added boost is required from said inboard engine supercharger to provide air under suitable pressure for the cabin.

It is a further object of the invention to provide a control system for the superchargers of a multi-engined aircraft wherein said supercharg-

2 ers are controlled in response to power demands, wherein at least one of said superchargers is also controlled in response to cabin air demands, and wherein manual adjustments are simplified and minimized.

These and other objects will become apparent as the description of the present invention proceeds.

In the drawings:

Figure 1 shows a schematic arrangement of the present control equipment as applied to a four-engined aircraft.

Figure 2 is a more specific schematic showing of the present control equipment as applied to the supercharger of one of the inboard engines.

Highly effective electrical control means are now used for simultaneously adjusting the operation of the turbo superchargers on each of the engines of a multi-engined aircraft. Generally, the engines are so adjusted by their propeller governors and the like, that the engines may be operated with wide open throttles and the power output determined by the manifold pressure, which in turn is governed by the turbo discharge pressure. Thus, by adjusting the turbo boost, or discharge pressure, the power outputs of the engines may be simultaneously adjusted. As will be noted, the present system of airflow control modifies the turbo boost control system in a manner to provide sufficient air pressure for cabin pressurizing and the least disturbance to the normal operation of the aircraft engines. The present cabin boost control system is more suitably applied to multi-engined aircraft, but it is noted that it may be used on even a single engined aircraft if it be desired to provide a low limit of turbo supercharger operation which will be variable according to the cabin pressure maintained.

In Fig. 1 of the drawing, cabin 10 is shown in its normal relation to inboard engines 2 and 3 and outboard engines 1 and 4 of a four-engined aircraft. Engines 1 to 4 are fitted with superchargers 11, 21, 31 and 41 driven by turbines 12, 22, 32, and 42, respectively. The speed of each turbine is controlled by controlling its waste gate 19, 29, 39, or 49, this being done by apparatuses 13, 23, 33, and 43, respectively. It is noted that the respective auxiliary and control equipment of each of the engines is similarly numbered with the exception that the first numeral of each number corresponds to the number of the respective engine. Thus, in describing the equipment associated with any one engine, the same description will be pertinent to each of the other engines, keeping in mind the system of numbering. While the superchargers of inboard engines 2 and 3 also furnish air to the cabin, as will be explained, the basic turbo control equipment is the same except for the cabin boost control which will be further discussed.

To broadly illustrate the association of the present apparatus, it is noted that the supercharger 11 of engine No. 1 delivers air through carburetor 14, which is provided with throttle lever 15, to the engine. Supercharger 11 is driven by turbine 12 through shaft 16. Turbine 12 is driven by the exhaust gases from engine No. 1 delivered to same through the exhaust pipe. The gases may pass through the turbine wheel or may pass through said turbine without generating power by exhausting past waste gate 19. When waste gate 19 is wide open, this constitutes the path of least resistance for said gases, hence only a negligible quantity of gas goes through the turbine in a manner to cause operation thereof. However, as waste gate 19 is closed, the increased flow of gas through the turbine causes it to rotate at an increased speed. The speed of the turbine, and the discharge pressure of the supercharger are thus seen to depend on the adjusted position of the waste gate.

The position of waste gate 19 is determined by a reversible two-phase motor 100 whose operation and direction of rotation is determined by the current supplied by amplifier 120. The current supplied by amplifier 120, and the phase relation of same, is determined by the signal currents supplied said amplifier.

The signals supplied amplifier 120 are the result of a compound electrical network including turbo boost control 180 and control apparatus 13.

It will be noted, disregarding cabin boost control 50, that turbo boost selector 180 simultaneously adjusts the operation of the turbo control apparatus of each engine. The turbo control system thus far described is similar to that disclosed in the copending application, Serial No. 486,992, of Hubert T. Sparrow et al., filed May 14, 1943, now Patent No. 2,466,282, issued April 5, 1949, and reference is herein made to said patent for a more complete description of the present system. In addition, the present system will be more fully explained as the specification proceeds.

At this point, it is noted that means are provided for controlling the superchargers of the engines of a multi-engined aircraft and for simultaneously adjusting the supercharger discharge pressure to be maintained by the control apparatus. The cabin boost control 50 has been disregarded during the preceding discussion, this being permissible for, under some conditions, said control may have no effect on the operation of the turbo control system.

In addition to supplying air to engines 2 and 3, superchargers 21 and 31 also supply air to cabin 10 through ducts 27 and 37, said ducts being provided with Venturi flow limiting means 28 and 38, respectively. Tube 51 connects cabin boost control 50 with the interior of cabin 10, tube 52 transmits the pressure existing upstream of flow limiting means 28 to controller 50, and tube 53 is connected to 37 upstream of 38 and to said controller 50.

Cabin boost control 50 comprises means for increasing the signal strength to amplifiers 220 and 320 if the other apparatus does not call for sufficient supercharger discharge pressure to satisfy cabin air demands. As shown in Figure 1, this device comprises minimum flow control adjusting means 61' and 61, signal lights 59' and 59 and switches 55' and 55, associated with the control of apparatuses 23 and 33, respectively. In addition, a low altitude cruise transfer potentiometer having an adjusting means 56 is also provided. The operation of this control, as well as the rest of the apparatus, will be explained later. Further, as cabin boost control 50 includes the means by which the present invention is distinguished from the aforesaid Sparrow et al. application, this apparatus is more specifically shown in Figure 2 as is the basic turbo control system, each being shown associated with engine No. 3. Because the present invention is difficult to explain without reference to the turbo boost control system, this too, will be more fully described. In describing the turbo boost control system, as specifically shown in Fig. 2 and as related to engine No. 3, it should be noted that the description applies equally well to the apparatuses of engines 1, 2 and 4. The present specific description is made of engine No. 3 and its associated apparatus rather than engine No. 1 because the turbo control apparatus is the same in either case, but the turbo supercharger of engine No. 3 also supplies cabin air under the control of control 50. In addition, it is noted that the association of the cabin boost control with the turbo boost control apparatus of engine No. 3 is the same as that with engine No. 2.

Supercharger 31 is driven by turbine 32 through shaft 36 and also imparts motion to shaft 36' by means of gearing. Turbine 32 is driven by exhaust gases from engine 3 and its speed is governed by permitting more or less of the exhaust gases to pass out through a by-pass controlled by waste gate 39. It was previously noted that the power output of the engines may be controlled by varying the discharge pressure of the superchargers, and it is again noted that the discharge pressure of said superchargers depends on the speed of rotation of their respective driving turbines. The speed of rotation of the turbines depends on the amount and pressure of the exhaust gases which pass through the blades of the turbine, this being regulated by regulating the flow of gases through the by-pass which is controlled by the waste gate. It therefore becomes clear that turbo discharge pressure may be controlled by controlling the waste gate of the respective turbine. The position of waste gate 39 is controlled by reversible geared motor means 300 operating arm 301 of bell crank 302 which is connected by link 303 to arm 304 which is attached to the shaft which carries waste gate 39. Angular motion of arm 301 causes rotating movement of waste gate 39 and thus varies the quantity of gas which may by-pass the turbine wheel of turbine 32. In the position shown, waste gate 39 is in wide open position. A counterclockwise movement of arm 301 will cause closing movement of waste gate 39 and thereby increase the speed of the turbine 32.

As before noted, geared motor 300, which drives bell crank 302, is of a two phase reversible type. This motor comprises a pair of field windings arranged 90 electrical degrees apart. One of said windings is energized by the line current from the airplane power supply through series condensers 310, the circuit being line 150, wire 154, motor 300, wire 155, condenser 310, wire 156, and line 153. The other winding of the motor is energized from current supplied by amplifier means 320 through wires 162 and 163 leading from terminals 321 and 322, respectively. The direction of rotation of the motor depends upon the phase relation of the current supplied from the amplifier. If the current supplied by the amplifier leads the current supplied by the line, rotation will be in one direction whereas, if the amplifier supplies current lagging that supplied by the lines, rotation will be in the opposite direction. In the practical embodiment of the present invention, motor 300 also includes a follow-up, or rebalancing, potentiometer 330. However, for the purpose of this schematic showing, the rebalancing potentiometer is shown as a separate element operated by arm 305 of bell crank 302.

Amplifier 320 has signal input terminals 323 and 324. It also has output signal terminals 321 and 322, as well as power supply terminals 325 and 326. This amplifier is of the sort which amplifies alternating current signals and maintains their phase relation. Any suitable amplifier that will maintain the same phase relation through same may be used, but I prefer to use one such as shown in the copending application of Albert P. Upton, Serial No. 437,561, filed April 3, 1942, now Patent No. 2,423,534, issued July 8, 1947. Power for the operation of amplifier 320 is supplied by the circuit: line 150, wire 151, terminal 325, terminal 326, wire 152, and line 153. Line 150 is a common and grounded wire of the airplane's power supply whereas line 153 is the hot wire and, ordinarily, is energized with a 115 volt, 400 cycle alternating current. The airplane power supply also includes line 160, which for its return uses common wire 150, and which is energized with a 26 volt, 400 cycle alternating current.

Amplifier 320 receives signals from a compound network comprising a plurality of electrical networks connected in series. The input signal circuit of amplifier 320 is traced from terminal 323 through wire 327, arm 331 of follow-up potentiometer 330, electrical network 340, arm 341 of velocity responsive means 342, wire 343, arm 344 of acceleration responsive means 345, network 360, arm 361 of induction pressure responsive means 362, wire 363, terminal 70 of cabin boost control means 50, wire 71, arm 72, resistor 73, wire 74, terminal 75, wire 364, and turbo boost selector 180. Turbo boost selector 180 is grounded through arm 181 and wire 182 and receives current through wires 190 and 191 from lines 150 and 153, respectively. Input terminal 324 of amplifier 320 is connected by wire 380 and wire 381 to grounded wire 182. Arm 331 of follow-up potentiometer 330 is actuated by arm 338 attached thereto and connected to arm 305 of motor 300 by link 339.

Network 340 comprises a transformer 346 having a primary winding 347 energized through wires 348 and 349 from line wires 153 and 150, respectively. Transformer 346 includes secondaries 350 and 366. Resistor 356 is connected to the left hand terminal of secondary 350 by wire 352 and connected to an intermediate tap 354 by wire 353. Resistor 357 of follow-up potentiometer 330 is connected to tap 355 by wire 358 and to the right hand terminal of secondary 350 by wire 359.

Velocity responsive means 342 and the acceleration responsive means 345 are driven by a common shaft 36', a continuation of shaft 36' shown in the upper portion of Figure 2. Any suitable velocity responsive means and acceleration responsive means may be used in the present instance, but I prefer to use a combined structure such as disclosed in the application of Hubert T. Sparrow et al., Serial No. 476,798, filed February 22, 1943, now Patent No. 2,474,203, issued June 21, 1949. Arm 341 of velocity responsive means 342 moves to the left across resistor 356 in the event of overspeed of the turbine 32.

Electrical network 360 is seen to comprise a bridge circuit having an input source of current from secondary 366 of transformer 346. The left end of said secondary is connected to said network by wire 367, which connects to wire 368, non-resistive slide portion 369, resistor 370, wire 371, and wire 372 to the right end of said secondary. Wire 367 also connects to wire 373, resistor 374, and wire 375 which connects to wire 372. Arm 344 of acceleration responsive means 345 is moved to the right across the non-resistive slide portion 369 and resistor 370 as acceleration is increased. Because the first portion of travel of arm 344 is on non-resistive slide portion 369, there is no response or change in circuit conditions for relatively minor accelerations of the turbine.

Induction pressure responsive means 362 operates arm 361 over resistor 374 to the left as induction pressures rise. Device 362 comprises an evacuated bellows 377 extended by spring means and coacting with arm 361 in opposition to bellows 378 connected by tube 379, to the discharge conduit of supercharger 31.

Turbo boost selector network 180 comprises a transformer 188 having a primary 189 connected to lines 150 and 153 by wires 190 and 191, respectively. The left end of secondary 192 of said transformer 188 is connected by wire 193 to the left end of resistor 194 while the right end of said resistor 194 is connected to the right end of said transformer by wire 195. Wire 196 also connects to the right end of secondary 192, and wire 197 is connected to an intermediate tap 198 of said secondary. Calibrating potentiometers 183, 283, 383, and 483 are connected between said wires 196 and 197. Arm 181, which moves across resistor 194, is manually controlled by knob 185 and is used to establish the desired boost for the turbo superchargers of the aircraft. As will be made clear later, with the exception of the adjustment permitted by calibrating potentiometers, adjustment of operation of the outboard superchargers is manually adjusted only by arm 181 moved by knob 185. As will be seen, operation of the turbo superchargers of the inboard motor shown is subject not only to turbo boost selector 180, but also to regulation by cabin boost control 50, to be described.

Cabin boost control means 50 comprises differential pressure responsive means 62 which includes bellows 63, connected to the interior of the cabin by tube 51, and bellows 64 connected to the upstream side of Venturi means 36 and 37 by tube 53. Bellows 63 and 64 coact with pivoted lever 65, which is urged to the right by adjustable spring means 66. Spring means 66 is tightened by clockwise movement of adjusting knob 61. Pivoted arm 65 includes contact portions which engage stationary contacts 80 or 81, contact 81 being engaged when cabin pressure is relatively high as compared to the supercharger discharge pressure. Arm 65 is connected by wire 82 to switch terminal 83 which is engageable by manually movable switch means 55.

Differential pressure responsive means 62 and manual switch 55 control the operation of a two-phase resistor type reversible motor 85. Motor 85 comprises an armature 86 and field windings 87 and 88 arranged 90 electrical degrees apart. Winding 87 is energized by the circuit: line 150, wire 90, terminal 91, wire 92, wire 93, winding 87, resistor 94, wire 95, terminal 96, and line 160. Winding 88 is energized by the circuit: line 150, wire 90, terminal 91, wire 92, wire 93, winding 88, wire 97, resistor 99, wire 100, wire 95, terminal 96, and line 160. With the circuit as recited, it is noted that the windings are equally excited and that an equal amount of resistance is in circuit with each one, resistors 94 and 99 being of equal value. These conditions are not conducive to rotation of said armature; in fact, the armature is magnetically locked in place.

In addition to the circuit above described, other wiring is associated with said motor. A short circuit may be established around resistor 94 by the circuit: wire 101, switch blade 102, switch blade 103, wire 105, and wire 106 to terminal 107 which is engaged by manual switch 55. Manual switch 55 connects by wire 108 to resistor 94. It is thus noted that when switch 55 engages terminal 107 and when switch blade 102 is in engagement with switch blade 103, a short circuit is established around resistor 94. Switch blade 103 has an extension portion 104 through which blade 103 is operated in a manner to be described.

When switch blade 55 is in contact with terminal 83, another circuit short circuiting resistor 94 may be established by the wire 101, switch blade 102, switch blade 103, wire 105, wire 110, switch contact 80, arm 65 of differential responsive means 62, wire 82, terminal 83, switch blade 55, and wire 108 to resistor 94. However, blade 65 is not in engagement with contact 80, hence this circuit cannot be considered complete.

Resistor 99 may be short-circuited by the circuit: wire 111, switch blade 112, switch blade 113, wire 115, switch contact 81, arm 65, wire 82, contact 83, switch blade 55, wire 108, wire 106, and resistor 99. Switch blade 113 has an extension 114 useful in a manner to be described. It is noted that only when switch blade 55 contacts terminal 83 can resistor 99 be short-circuited. Short-circuiting one or the other of said resistors alters the phase relation of one of the windings of said motor relative to the other and causes rotation, the direction of rotation depending on which of the resistors in short-circuited.

Armature 86 of motor 85 drives arm 72 through gear box 169 to the right or left across resistor 73 depending upon the rotation of said armature. Arm 72 includes stop portions 117 and 118 which may coact respectively with extended switch portions 104 or 114. In the position shown, stop portion 117 has engaged portion 104 and broken contact between switch blade 103 and blade 102 thereby opening the short-circuit which would otherwise exist around resistor 94. The circuit which might by-pass resistor 99 is also opened because switch blade 55 is in contact with terminal 107 instead of terminal 83. Thus, armature 86 is now magnetically locked in place but rotation may be caused in a direction to move arm 72 to the right if switch blade 55 be moved to engagement with contact 83. When stop portion 118 of arm 72 engages extension portions 114 of switch blade 113 and breaks contact between switch blade 113 and blade 112, contact is made between switch blade 113 and switch blade 120 which energizes signal light 59 by the circuit: line 150, wire 90, terminal 91, wire 92, wire 121, light 59, wire 122, switch blade 120, switch blade 113, wire 115, contact 81, blade 65, wire 82, switch contact 83, switch arm 55, wire 108, wire 95, terminal 96, and line 160. Thus light 59 may be energized when blade 72 is moved to the extreme right of resistor 73.

In addition to reset resistor 73, cabin boost control 50 also includes low altitude cruise transfer means 57 which is adjusted by manual knob 56. Low altitude cruise transfer means 57 comprises a transformer 130 having a primary 131 energized in parallel with transformer primary 189 by wires 132 and 133. Secondary 134 of said transformer is connected at its right end to the right end of resistor 135. The left end of resistor 135 is connected to terminal 132 which in turn is connected to fixed resistor 137. The other end of fixed resistor 137 is connected to the left end of secondary 134 and is grounded by the circuit: wire 138, terminal 139, wire 140, wire 381, and wire 182 to ground. An arm 141 is adjusted across resistor 135 by knob 56.

As Figure 2 shows only the control equipment needed for the No. 3 engine of the aircraft and the equipment common to the control apparatus of the other engines, of the aircraft, it should be noted that in this figure portions of cabin boost control 50 would normally be duplicated. As shown in Figure 1, cabin boost control 50 would, if both inboard engines of the aircraft are used for pressurizing the cabin, comprise another pressure responsive means similar to 62, another motor such as 85 complete with its control equipment and wiring, an additional signal light means, and a reset potentiometer such as that including arm 72 and resistor 73. The low altitude cruise transfer means 57 is common to the control means for both sides of the plane. Arm 141 is connected to the right end of resistor 73 by wire 142, and wire 143 is shown leading to the right end of a duplicate resistor which would be used in the dual controller. Likewise, cabin pressure is transmitted to cabin boost controller 50 by tube 51 which leads into a T fitting, one end of which extends into bellows 63 and the other end of which is shown plugged. This plugged end would normally extend to the cabin pressure responsive bellows of the duplicate differential pressure responsive means.

While certain of the present apparatus has been rather specifically described, it is obvious that many changes may be made within the scope of this invention. For instance, motor 85 may be any conventional reversible motor; differential pressure responsive means 62 is subject to many modifications, and the differential pressure may be obtained from the inlet and the throat of the venturi instead of from the inlet and the cabin as shown. In addition, the present cabin boost control is shown associated with a turbo boost control system such as fully disclosed in the afore-mentioned Sparrow et al. Patent 2,466,282 and, while said turbo boost control system is that preferred, the present cabin boost control system may be used to establish a low limit of turbo operation for any suitable turbo boost control system.

To more fully explain the correlation of the present control apparatus, the following description of operation follows.

*Operation*

In considering the operation of the present control apparatus, it is noted, as before pointed out, that the various elements of the apparatus are in their positions of rest, with the airplane stationary and at sea level. The turbo boost selector 180 is adjusted to zero boost, the induction pressure responsive device 362 indicates atmospheric pressure, the acceleration responsive means 345 is in a position of no acceleration, the velocity responsive means 342 shows zero velocity, and waste gate 39 is wide open. Further, the switch of the cabin boost control means is in off position and arm 72 is at a position to add no voltage to the turbo boost control system.

As before noted, operation of waste gate motor 300 depends upon whether or not its amplifier 320 is furnishing current to same. Further, the direction of operation of said motor depends upon the phase relation of the current supplied the motor by the amplifier as compared to that of the line current. Since the phase relation of the output of the amplifier depends upon that of the input, an analysis of the control networks will determine whether or not a signal is being supplied said amplifier and the phase relation of same. To expedite a consideration of these networks, the instantaneous current relation existing in the network during a half cycle may be considered. Then, the left end of each of the bridges may be considered negative in potential and the right end positive. Considering the operation of the network on a half cycle basis, it may be determined whether or not there is a signal resulting from same and the signal will then appear to be either positive or negative in potential. However, with alternating current, a signal which is negative in potential at one instant becomes, a half cycle later, positive in potential. It is thus obvious that what appear to be positive and negative signals actually represent signals 180° different in phase. Therefore, while it is noted that signals of one phase relation will cause the waste gate motor to operate in one direction, and signals of another phase relation will cause said motor to operate in the opposite direction, in this analysis signals having a positive potential will cause the waste gate motor to operate toward open position and signals having a negative potential will cause said waste gate to be closed. The voltage at arm 181 of turbo boost selector 180, is shown to be zero whereas the potential at arm 365 of calibrator potentiometer 383 may be assumed as 26 volts above the left side of the network. Therefore, the signal from turbo boost selector 180 is 26 volts positive. With a 30 volt potential existing across the input terminals of network 360, arm 361 appears to be at a position corresponding to a potential of about 10 volts. However, arm 344, being at the left end of resistor 379, is at zero volts. Therefore, the output current from network 360 would be negative 10 volts. Arm 341 is at the extreme right of resistor 356, the potential between wires 353 and 358 may be considered 6 volts and, since arm 331 is at the left end of resistor 357, then arm 331 is thus only 6 volts higher in potential than arm 341, therefore the output of network 340 is 6 volts positive. Adding up the voltage signals from each of the networks, it becomes apparent that there exists a signal of 22 volts positive, therefore waste gate motor 300 maintains said waste gate wide open, further rotation being prevented by internal stops associated with said motor.

Assume now that the aircraft is being prepared for the take-off. As the power output of the engines is increased preparatory to the beginning of the flight, it is obvious that the added rate of air flow through the induction system will cause the induction pressure to drop. As will be noted, as arm 361 moves to the right, arm 344 becomes more negative relative thereto; however, as the total travel of arm 361 to the right from its previous position permits a change of only 20 volts, this in itself cannot cause operation of the waste gate motor. For the take-off of the aircraft, a high power output is ordinarily required from the engines, so let it now be assumed that arm 181 is moved to position 8 on resistor 194 of turbo boost selector 180. Position 8 corresponds to a potential of about 24 volts positive relative to the left side of the network and, as arm 365 is at a potential of about 26 volts positive, relative to said side, the output of the turbo boost selector becomes two volts positive. In the meantime, due to the high rate of air flow through the induction system, and the result of pressure drop therein, assume that arm 361 has moved to the mid-point of resistor 374. Arm 344 is then 15 volts negative with respect to arm 361, thus the output of network 360 is 15 volts negative. Arm 341 may be considered to remain in its previous position as may arm 331. With this assumption, the output of network 340 is again 6 volts positive. However, on adding the voltages, it becomes apparent that the output of the series of networks is a 7 volt negative signal. As the negative signals will cause a closing movement of the waste gate motor, arm 331 will be moved to the right across resistor 357 and thus increase the positive potential of network 340 sufficiently to offset the negative voltage signals of the previous networks. This would appear to require movement of arm 331 across $\frac{7}{12}$ of said resistor assuming a 12 volt potential existing across resistor 357. Thus, the waste gate would then be moved more than half closed. However, as the waste gate moves toward closed position, the induction pressure rises, therefore the negative voltage signal of network 360 is diminished as arm 361 is moved to the left across resistor 374 by the rising induction pressure. Rebalancing is thus effected not only by the follow-up potentiometer of the waste gate motor, but also by the induction pressure responsive means. It has been assumed up to this point that the rate of acceleration has been within due limits and that the velocity of the turbine has not exceeded its proper bounds. As before noted, portion 369 of resistance 370 represents a slide portion of negligible resistance change, therefore minor changes in acceleration have no effect on the network. However, should the acceleration become excessive, arm 344 is moved to the right across resistor 370 and, as it approaches the position of arm 361 or travels to the right thereof, it tends to wipe out the negative signal and to cause a positive signal thereby tending to drive the waste gate motor open. Driving the waste gate open causes a reduction in turbine speed and therefore tends to limit the acceleration of same. In the same manner, if the velocity of the turbine reaches excessive values, arm 341 is moved to the left across resistor 356 and thus is moved further to the left of arm 331, thereby causing positive signal voltages of increased magnitude which tend to open the waste gate. The present description of operation of a turbo boost control system, shown specifically for inboard motor No. 3, applies in the same manner to each of the motors of the aircraft. Thus, when the switches of the cabin boost control are turned to "off," the turbo superchargers of each of the engines of the aircraft may be simultaneously controlled by the turbo boost selector in the manner described.

For a more complete and detailed description of the operation of this turbo boost control system, reference is again made to said Sparrow et al. Patent No. 2,466,282.

With the control knob of the turbo boost selector turned to position 8, and the aircraft rising, attention may now be directed to the cabin boost control. The pressure to be maintained in the cabin, as before mentioned, is normally controlled by pressure regulating means, not shown, which controls the flow of air from the cabin. Assume that a cabin pressure of 22 inches of mercury is to be maintained, this pressure corresponding to an altitude of about 8,000 feet; this pressure being generally considered about as low as human beings normally should stand. The minimum flow control knob 61 may be adjusted to a position of medium flow, knob 56 of the low altitude cruise transformer potentiometer may be adjusted to its 8000 foot mark and switch 55 may be thrown to the automatic position.

With a turbo boost adjustment at position 8, it is noted that the turbo superchargers are operating to provide a relatively high induction pressure. This pressure may be considered to be well above the 22 inches of mercury cabin pressure being maintained, so arm 65 of differential pressure controller 62 is moved to the left into engagement with contact 80. With arm 65 in engagement with contact 80, and switch 55 engaging contact 83, motor 85 remains in the position shown and there is no change in operation of the turbo boost system. If the airplane now levels off for cruising at about a 10,000 foot elevation, high power outputs may no longer be demanded and the turbo boost selector may be turned back to about position 5, or lower. With arm 181 at position 5, the signal output of network 180 is 11 volts positive. Assuming that arm 361 is at about the mid-point of resistor 374, and arm 344 is at the left end of resistor 370, the output of network 360 is again about 15 volts negative. With arm 341 at the right of resistor 356 and arm 331 $\frac{7}{12}$ of the way across 357, the output of network 340 is 13 volts positive. Adding these voltages reveals that there is a signal of 9 volts positive. As positive voltage signals cause opening of the waste gate, the waste gate is now driven toward open position and arm 331 moves to the left across resistor 357. In addition, as the waste gate is opened, the induction pressure diminishes and may be considered to drop to about 20 inches of mercury. With an induction pressure of about 20 inches of mercury, the voltage output of network 360 may become about 22 volts negative. Assuming that there is no overspeed, it then becomes apparent that the output of network 340 must have a positive voltage signal of 11 to rebalance the network. This requires that arm 331 move to the left a distance corresponding to 2 volts change. Thus, it is noted that relatively slight movements of the waste gate are needed to give the desired control of the turbine. However, as the induction pressure was before noted to be about 20 inches of mercury, it is recalled that an effort was being made to maintain about 22 inches of mercury pressure in the cabin. Obviously, the discharge pressure of the turbo superchargers of the inboard engines must be increased if air is to be supplied to the cabin under the required pressure. As it is necessary that the air supply be at a pressure sufficiently higher than cabin pressure to give a desired rate of flow, it may be assumed that the discharge pressure should be 2 inches of mercury higher than cabin pressure to give the desired rate of air flow through restrictor means 38. Thus, if the differential of pressure between cabin and turbo discharge is less than 2 inches of mercury, arm 65 makes engagement with contact 81. If the differential pressure exceeds 3 inches of mercury, for instance, arm 65 engages contact 80, and at intermediate differential pressures, arm 65 engages neither of contacts 80 nor 81. With switch 55 in automatic position (engaging contact 83), and the differential of turbo discharge pressure over cabin pressure less than 2 inches of mercury, arm 65 is in engagement with contact 81, resistor 99 is short circuited out of the motor circuit and armature 86 of motor 85 is rotated in a direction to drive arm 72 to the right across resistor 73. Movement of arm 72 to the right across resistor 73 adds negative voltage signals to the turbo boost control network and thus tends to cause closing movement of waste gate 39. Closing movement of waste gate 39 will then cause a rise in induction pressure and an increase in the differential of pressure between turbo discharge and cabin pressure. Arm 72 is geared to be moved slowly by armature 86 so that the readjustment of the turbo boost control system takes place no more rapidly than the differential of induction pressure to cabin pressure varies, this being required to keep the system reasonably stable. If the desired differential of turbo discharge pressure to cabin pressure rises above the required 2 inches of mercury when arm 72 is but half way across resistor 73, arm 65 is moved out of engagement with contact 81 and motor 85 is stopped. Arm 72 therefore remains in its half way position on resistor 73. Should the differential pressure diminish, arm 65 would then be reengaged with contact 81 and arm 72 would again move to the right across resistor 73. However, should the differential rise above the aforesaid 3 inches of mercury, arm 65 would engage contact 80 and drive motor 85 in a reverse direction, thereby moving arm 72 to the left across resistor 73 and diminishing the negative voltage signal applied to the turbo boost system. This would tend to again open waste gate 39. It is thus noted that the cabin boost control system will add voltage signals to a turbo boost control system only sufficient to cause a turbo boost discharge pressure to rise to the required level to give needed cabin ventilation. Obviously, as the turbo discharge pressure of the inboard engine is raised by the cabin boost control, the power output of said engine will also tend to rise. To maintain best control of the airplane, it is required that all of the engines be operated at approximately uniform power output, therefore to offset the added boost pressure of the inboard engine, throttle 35 must thereby be operated to restrict the power output of the inboard engine to the same level as the other engines. Of course, if cabin boost control 50 also controls No. 2 engine, its throttle must likewise be adjusted.

It is noted that the cabin may be ventilated without the use of a cabin boost control by keeping the turbo boost control selector adjusted to a position of about 7 or higher at all times and then, if lower output of the engines be desired, the lower output may be obtained by closing the throttles of said engines. However, this scheme of operation is inferior to the present described system in that added manual manipulation of throttles is required, difficulty may be had in adjusting the turbo discharge pressure to exactly the point required to give the desired ventilation without overshooting the minimum desired differential, the efficiencies of all of the engines are lowered due to the operation under partial throttle. It is noted that the efficiencies of the inboard engine or engines with the present cabin boost control system in operation are somewhat lowered because of a throttled operation required for same, but because the outboard engines are not affected thereby, their efficiencies remain high. Further, the interference with the efficiencies of the inboard engines is a minimum because the present cabin boost control automatically calls for only sufficient boost to give the required flow of air into the cabin. In addition, it has been found that under some conditions, the properly controlled diverting of air from the inboard engine superchargers contributes to smooth operation of said engines. Under light loads, there tends to be surging in the induction systems which causes unstable running of the respective engines. By diverting a portion of the air from a supercharger to the cabin, surging is minimized and smoother engine operation results. Thus by setting the control knob to the desired point, the system automatically compensates for differences in running conditions, etc., and provides the needed pressure for the cabin.

The present cabin boost control means is of value when the airplane starts descending toward a landing field. Then the cabin pressure may be increased at a predetermined rate by the pressure regulating means but it is noted that the pressure regulating means is dependent on, and proper ventilation requires, the maintenance of a proper air flow into the cabin. As the engines are usually adjusted to low power outputs when descending, it is obvious that correction must be applied to the inboard engines control system to maintain the proper air flow. Further, an effort may be made to build up the cabin pressure to that of the field at which the landing is to be made prior to landing so that the cabin boost control can be switched to off position just before landing. Then, if an emergency take-off becomes necessary, the turbo boost control will have full authority, without waiting for motor 35 to readjust arm 72.

Because it is advisable to warn the pilot when the cabin boost control is adding all the voltage it can to the turbo boost control system to give the desired airflow, it is noted that when arm 72 reaches the extreme right of its travel, stop portion 118 engages 114 and moves switch arm 113 out of engagement with arm 112 to prevent further travel of the motor which would tend to drive arm 72 off the end of resistor 73. This also drives said switch arm 113 into engagement with switch arm 120 thus causing energization of signal light 59. The energizing of signal light 59 indicates to the pilot that the cabin boost control can add no more voltage to the turbo boost system unless knob 56 be adjusted.

The amount of voltage that may be added by movement of arm 72 across resistor 73 is determined by the low altitude cruise transfer potentiometer 57, and the voltage drop across said resistor is jointly due to the voltage added by potentiometer 57 and the adjustment of selector 180. As the output voltage of selector 180 is decreased, the potential drop across 73 is diminished and the sensitivity of the reset potentiometer is thereby decreased. Assuming that the potential across secondary 134 is 12 volts, and that resistor 137 has half the resistance value of resistor 135, it appears that the voltage at terminal 132 is about 4 volts and the voltage at the extreme right of resistor 135 is about 12 volts. Thus, by adjustment of knob 56, the voltage that may be added by operation of arm 72 across resistor 73 will vary from 4 volts to 12 volts depending upon the position of arm 141 relative to resistor 135. In the position shown, with arm 141 at the 4 volt position, the total voltage that can be added to the turbo boost system when arm 72 is at the right of resistor 73 is 4 volts. When arm 141 is adjusted by turning 56 until said arm is at the right of resistor 135, then, when arm 72 is at the right of resistor 73, 12 volts may be added to the turbo boost system. It has been found that an increase in signal strength of about 4 volts is all that is needed to give the desired supercharger boost for a cabin pressure of 22 inches of mercury, corresponding to about eight thousand feet elevation. However, at times it is required that the cabin pressure be higher than 22 inches of mercury during the periods of comparatively low power output from the engine, such as low altitude cruising. To be able to give the desired boost, low altitude cruise transfer potentiometer 57 is adjusted by turning knob 56 to approximately the altitude to be maintained in the cabin, such as near sea level for very low altitude flying. Then, operation of the differential pressure controller, made effective through movement of arm 72 across resistor 73, will permit an additional 12 volts negative to be applied to the turbo boost control system to raise the discharge pressure sufficiently to insure cabin ventilation. It is thus noted that motor 35 driving arm 72 across resistor 73 in response to the operation of differential controller 62 determines whether or not correction will be made, and the relative amount of correction that may be made, to the turbo boost control system to give the desired flow of air into the aircraft cabin. The low altitude cruise transfer potentiometer determines the relative authority of the cabin boost flow control, it being noted that the higher the voltage applied to resistor 73 by low altitude cruise transfer potentiometer 57, the more authority the cabin boost control will have in modifying the turbo boost control system.

If the low altitude cruise transfer potentiometer 57 should be adjusted for maximum authority, that is at its maximum voltage, and only a 22 inch cabin is desired, the apparatus will function as before, but with added sensitivity. Because movement of arm 72 across resistor 73 may involve a greater potential change than when said potentiometer is adjusted to minimum voltage, it will be noted that less movement will be required to increase the turbo boost pressure a given amount than when same is adjusted for normal operation with an 8000 foot cabin although it is noted that adjusting arm 181 of selector 180 to the right may offset any change in sensitivity to movement of arm 72 caused by increased voltage from potentiometer 57. Added sensitivity is of no particular disadvantage excepting that the apparatus may become oversensitive and result in hunting.

It is noted that the present system comprises means adding voltage signals to an electrical turbo boost control system in response to the action of a differential pressure controller but it should be noted that many substitutions and equivalents suggest themselves upon a study of this system as before noted. In addition to the possible changes previously mentioned, it is contemplated that the low altitude cruise transfer potentiometer may be eliminated by judicially selecting a voltage to be applied to resistor 73 which will not cause oversensitive operation of the apparatus and yet will provide sufficient modification of the turbo boost control system to give a desired air flow under any practical operating condition of the aircraft.

In view of the many modifications and substitutions that may be made in the present apparatus, the scope of the invention should be determined only by the appended claims.

I claim as my invention:

1. In an aircraft having a plurality of engines and a supercharged cabin, individual turbo superchargers driven by the respective engines with which they are associated for supplying air thereto, each of said turbo superchargers having a controllable exhaust discharge means and an air discharge means, a waste gate means controlling the flow of exhaust gas through said exhaust discharge means, conduit means for diverting air from one of said turbo supercharger air discharge means to said cabin; an electric motor means for operating each of said waste gate means, circuit means controlling each of said motors, manually adjustable means for simultaneously adjusting said circuit means to thus simultaneously adjust the air discharge pressure of each of said turbo superchargers; and control means for supplementing the circuit means regulating the air discharge pressure of said one supercharger comprising means responsive to air flow through said conduit means, switching means actuated by said air flow responsive means, reversible motor means controlled by said switching means, and impedance means in said circuit means adjustable by said reversible motor means in a manner to control said one turbo supercharger in a manner to maintain said air flow above a predetermined value.

2. In an aircraft having a pressurized enclosure, an internal combustion engine equipped with a turbo supercharger for supplying air thereto, said supercharger also supplying air to said enclosure, first electrical circuit means for controlling said turbo supercharger in a manner to satisfy the demands of the engine, and supplementary electrical circuit means connected to said first circuit means and including means responsive to the rate of flow of air to said enclosure, said supplementary circuit means controlling said first circuit means in a manner to establish an adjustable low limit of operation of said turbo supercharger.

3. In a control apparatus for modifying a control system including an electrical circuit which governs the operation of the turbo superchargers of a plural engined aircraft having a pressurized cabin wherein a portion of the air compressed by at least one of the superchargers is directed into the cabin, comprising, in combination, switch means, means responsive to the rate of air flow to said cabin for operating said switch means, a reversible motor means controlled by said switch means, potentiometer means including a resistor connected into said electrical circuit, said reversible motor means being connected to said potentiometer for adjusting the same, and manually adjustable means for varying the controlling effect of said potentiometer.

4. In a control apparatus for modifying a control system including an electrical circuit which governs the operation of the turbo superchargers of a plural engined aircraft having a pressurized cabin wherein a portion of the air compressed by at least one of the superchargers is directed into the cabin, comprising, in combination, differential pressure responsive means adapted to be connected in a manner to indicate air flow into said cabin, reversible motor means, means actuated by said differential pressure responsive means for controlling the operation of said motor means, variable impedance means adjustable by said motor means and provided with connection means for connection into the electrical circuit of said control system, and connection means for connecting a source of electrical potential across said impedance means.

5. In an aircraft having plural engines each equipped with and supplied air under pressure by a turbo supercharger, said aircraft having a pressurized enclosure, means for diverting air from one of said turbo superchargers to said enclosure, the discharge pressure of each of said turbo superchargers being controlled by means including an electrical network, manual means for simultaneously adjusting each of said networks to vary the operation of all of the turbo superchargers substantially uniformly, circuit controlling means responsive to the flow of said diverted air, and means for connecting said circuit controlling means into the network of said one turbo supercharger in a manner to establish a low limit of discharge pressure for said one turbo supercharger even though said manual control may adjust another supercharger to a lower discharge pressure.

6. In an aircraft having a plurality of engines and an enclosure maintained at a pressure above atmospheric, each of said engines being provided with a turbo supercharger, conduit means connecting the discharge of one of said superchargers to said enclosure for supplying air to said enclosure under pressure, means responsive to the flow of air through said conduit means, individual motor means for regulating the operation of each of said turbo superchargers, manually controlled electric circuit means for simultaneously controlling said motors for regulating the discharge pressures of said superchargers, and circuit controlling means governed by said air flow responsive means connected into the circuit means controlling said one supercharger in a manner to increase its discharge pressure without affecting the operation of the other superchargers.

7. In an aircraft having a pressurized enclosure, engine driven turbo supercharger means having air discharge means, conduit means connecting said discharge means and said enclosure, means responsive to air flow through said conduit means, reversible motor means for controlling the operation of said turbo supercharger means, an electrical network circuit means for controlling the operation of said motor means, said network means comprising means providing signals varying in voltage and phase, signals of one phase causing operation of said motor means in a direction to raise the discharge pressure of the supercharger and signals of a different phase causing operation of said motor means in a manner to lower said pressure, the voltage of said signals determining the amount of movement of said motor means required to rebalance the network, and means regulated by said means responsive to air flow through said conduit for introducing in said network signals of such phase and voltage as to cause a change in said discharge pressure.

8. In an aircraft having a supercharged cabin, means for controlling the pressure within said cabin, an engine driven turbo supercharger means for supplying air to said cabin, first means responsive to a condition affecting the operation of said engine for controlling the operation of said turbo supercharger means, means responsive to the differential of pressure between the cabin pressure and the discharge pressure of said supercharger, and second controlling means actuated by said differential pressure responsive means for modifying said first controlling means to maintain said differential pressure above a predetermined value.

9. In an aircraft having a supercharged cabin, means for controlling the pressure within said cabin, an engine driven supercharger means, conduit means connecting the discharge of said supercharger to said cabin to permit air flow therethrough, means responsive to the air flow through said conduit means, first means responsive to a condition affecting the operation of said engine for controlling said supercharger means, and second control means regulated by said air flow responsive means for modifying said first controlling means in such manner that said air flow will be maintained above a predetermined value.

10. In an aircraft having an internal combustion engine equipped with a turbo supercharger, said supercharger having a waste gate, means for controlling the waste gate of said turbo supercharger for insuring proper air supply to said engine comprising an electric motor connected in operative relation to said gate, amplifier means for supplying current to said motor, rebalancing means driven by said motor, and electrical network including said rebalancing means for supplying signals of varying voltage and phase to said amplifier means in a manner to cause said waste gate to assume a position to give the desired air supply to said engine, the operation of said gate by said motor being accompanied by operation of said rebalancing means in a manner to cause a cessation of said signals, means diverting a portion of the air from said supercharger to other useful purposes, and means responsive to said diverted air flow and associated with said network for modifying the signals supplied said amplifier in a manner to insure a predetermined minimum operation of said turbo supercharger even though the engine requirements for air are satisfied.

11. In an aircraft driven by an internal combustion engine, supercharger means driven by said engine for supplying air thereto, said aircraft having a pressurized enclosure, conduit means for diverting a portion of the air from said supercharger to said enclosure, electrical control means for regulating the operation of said supercharger including manually adjustable pressure selector means, said selector means providing an output electrical control signal of variable potential, means responsive to air flow through said conduit, and a potentiometer having a slider and a resistor and arranged to be adjusted in response to said air flow responsive means, said resistor being connected in series with said selector means, and said slider being connected to said electrical control means for modifying the control of said supercharger in response to the air flow to said enclosure.

12. In an aircraft driven by an internal combustion engine, supercharger means driven by said engine for supplying air thereto, said aircraft having a pressurized enclosure, conduit means for diverting a portion of the air from said supercharger to said enclosure, electrical control means for regulating the operation of said supercharger including manually adjustable pressure selector means, said selector means providing an output electrical control signal of variable potential, means responsive to air flow through said conduit, and a potentiometer having a slider and a resistor and arranged to be adjusted in response to said air flow responsive means, said resistor being connected to said selector means, and said slider being connected to said electrical control means, and an additional adjustable source of electrical potential connected to said resistor in such a manner that the potential drop across said resistor may be varied in response to the adjustment of said pressure selector and said adjustable source.

13. In an aircraft having a power plant for propulsion which requires a supply of air under pressure, said aircraft also having a supercharged enclosure requiring a much smaller supply of air under pressure, means for supplying said power plant with air under variable pressure, first means including means responsive to said supply pressure for controlling the power output of said power plant by controlling said supply means, conduit means also connecting said supply means to said enclosure, means responsive to air flow through said conduit, and adjustable second means controlling said supply means in response to said air flow responsive means in a manner to supersede said first means and maintain said air flow above an adjustable predetermined value without regard to the air pressure required by said first means.

WILLIAM EVERT WELCH.

REFERENCES CITED

The following references are of record in the file of this patent:

UNITED STATES PATENTS

| Number | Name | Date |
|---|---|---|
| 1,508,707 | Moss | Sept. 16, 1924 |
| 1,508,731 | Standerwick | Sept. 16, 1924 |
| 1,960,350 | Shackleton | May 29, 1934 |
| 2,002,057 | Gregg | May 21, 1935 |
| 2,119,402 | Puffer | May 31, 1938 |
| 2,173,331 | Haines | Sept. 19, 1939 |
| 2,182,192 | Becker | Dec. 5, 1939 |
| 2,208,554 | Price | July 16, 1940 |
| 2,265,461 | Wagner | Dec. 9, 1941 |
| 2,284,984 | Nixon et al. | June 2, 1942 |
| 2,350,896 | Joe | June 6, 1944 |
| 2,353,201 | Talbot | July 11, 1944 |
| 2,371,732 | Bristol | Mar. 20, 1945 |
| 2,374,708 | Shoults | May 1, 1945 |
| 2,376,142 | Hoffman et al. | May 15, 1945 |
| 2,377,199 | Adams | May 29, 1945 |
| 2,385,664 | Warner | Sept. 25, 1945 |
| 2,425,607 | Edwards et al. | Aug. 12, 1947 |
| 2,450,881 | Cooper et al. | Oct. 12, 1948 |
| 2,451,835 | Johnson | Oct. 19, 1948 |